US011757625B2

(12) United States Patent
Vass et al.

(10) Patent No.: US 11,757,625 B2
(45) Date of Patent: *Sep. 12, 2023

(54) MULTI-FACTOR-PROTECTED PRIVATE KEY DISTRIBUTION

(71) Applicant: MINE ZERO GmbH, Berlin (DE)

(72) Inventors: Attila Vass, San Francisco, CA (US); Jochen Kornitzky, Berlin (DE); Rolf Herken, San Francisco, CA (US)

(73) Assignee: MINE ZERO GMBH, Berlin (DE)

( * ) Notice: Subject to any disclaimer, the term of this patent is extended or adjusted under 35 U.S.C. 154(b) by 42 days.

This patent is subject to a terminal disclaimer.

(21) Appl. No.: 17/328,436

(22) Filed: May 24, 2021

(65) Prior Publication Data

US 2022/0006621 A1 Jan. 6, 2022

Related U.S. Application Data

(63) Continuation of application No. 16/325,338, filed as application No. PCT/US2017/047430 on Aug. 17, 2017, now Pat. No. 11,018,855.

(60) Provisional application No. 62/376,210, filed on Aug. 17, 2016.

(51) Int. Cl.
*H04L 9/08* (2006.01)
*H04L 9/14* (2006.01)
*H04L 9/32* (2006.01)

(52) U.S. Cl.
CPC ............ *H04L 9/0825* (2013.01); *H04L 9/088* (2013.01); *H04L 9/0863* (2013.01); *H04L 9/14* (2013.01); *H04L 9/3226* (2013.01); *H04L 9/3242* (2013.01)

(58) Field of Classification Search
None
See application file for complete search history.

(56) References Cited

U.S. PATENT DOCUMENTS

| | | | | |
|---|---|---|---|---|
| 2005/0071677 | A1* | 3/2005 | Khanna | H04L 9/3236 726/4 |
| 2015/0304315 | A1* | 10/2015 | Estehghari | H04L 63/045 713/156 |
| 2015/0326395 | A1* | 11/2015 | Lemke | H04L 9/3226 713/155 |
| 2016/0373418 | A1* | 12/2016 | Ståhl | H04L 63/08 |

* cited by examiner

Primary Examiner — Benjamin E Lanier
(74) Attorney, Agent, or Firm — JACOBS & KIM LLP; David Jacobs

(57) ABSTRACT

The present invention provides methods, systems and computer program products (software) for the reliable, attack-resistant authentication of a network-connected user to a network-connected service provider.

18 Claims, 11 Drawing Sheets

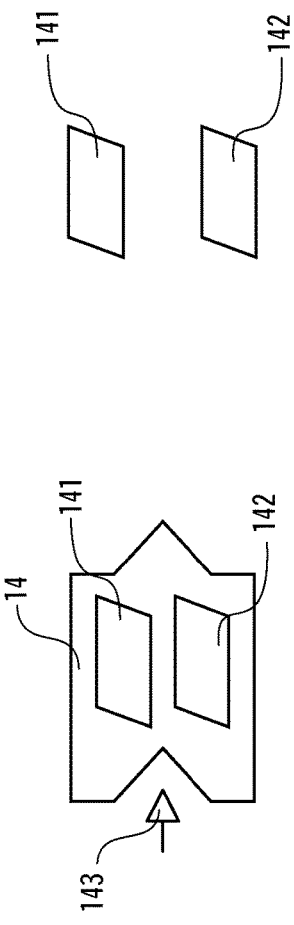
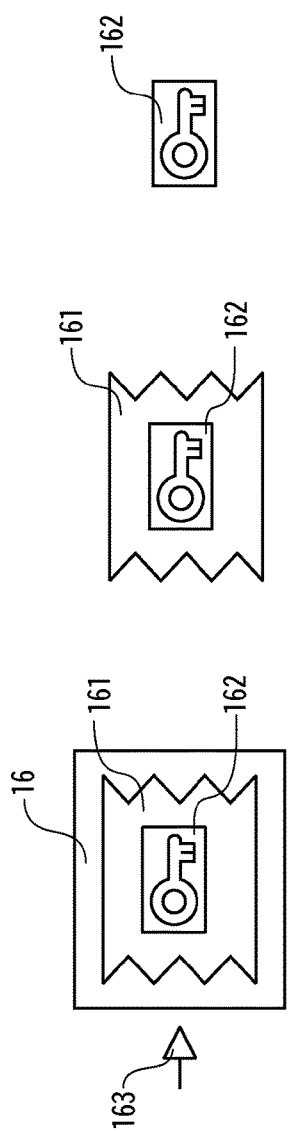
FIG. 3A
FIG. 3B
FIG. 3C
FIG. 4A
FIG. 4B
FIG. 4C
FIG. 4D

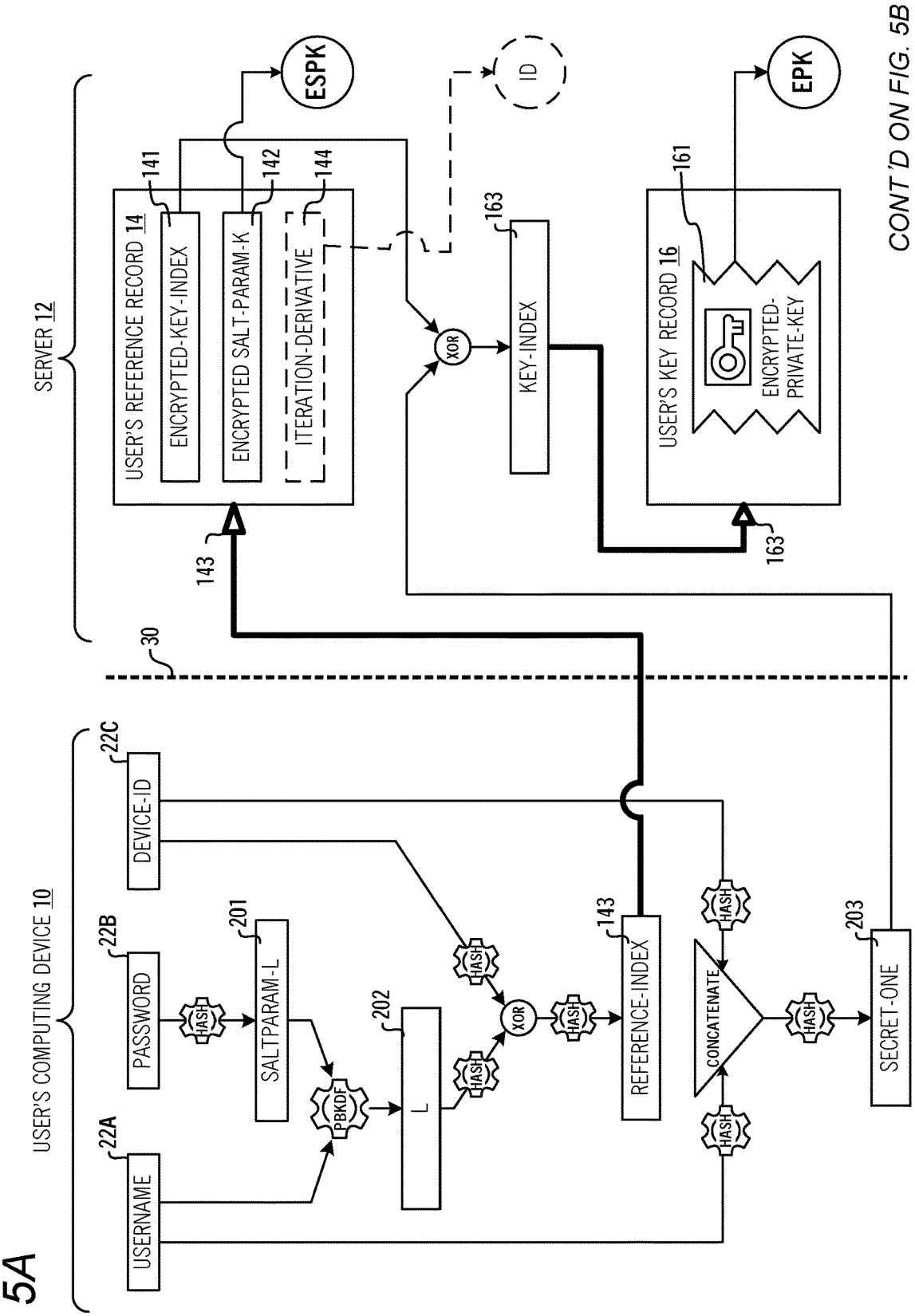

MULTI-FACTOR-PROTECTED PRIVATE KEY DISTRIBUTION

CROSS-REFERENCE TO RELATED APPLICATIONS: INCORPORATION BY REFERENCE

This application for patent is a Continuation of commonly-owned U.S. patent application Ser. No. 16/325,338 filed 13 Feb. 2019, which is a national phase entry (35 USC 371) of commonly-owned PCT Application PCT/US17/47430 filed 17 Aug. 2017, which claims the priority benefit of commonly-owned U.S. Provisional Application for Patent Ser. No. 62/376,210 filed 17 Aug. 2016. Each of the above-noted patent applications is incorporated by reference herein as if set forth herein in its entirety.

Also incorporated by reference herein as if set forth herein in their entireties are the following commonly-owned patent applications:

International Patent Application PCT/US16/22232 filed Mar. 12, 2016, entitled "Transactional Platform"; and U.S. Provisional Application for Patent Ser. No. 62/516,593 filed Jun. 7, 2017, entitled "Improved Transactional Platform".

FIELD OF THE INVENTION

The present invention relates to methods, systems, and computer program code products (software) for identification and authentication of users and other entities seeking to use or obtain access to services or resources provided by a network-connected service provider via a digital processing network; and includes methods, systems, and computer code products (software) relating to private key escrow and distribution within a public key infrastructure (PKI).

BACKGROUND OF THE INVENTION

Conventional computer network identification or authentication schemes, as used by many conventional websites on the Internet, authenticate their users via a username/password combination. An alternative to password-based authentication is a Public Key Infrastructure (PKI) approach, in which identity is tied to a published public key, referred to as a certificate if optionally signed by a certificate authority. In a mobile user setting, in which users may use multiple devices, it can be cumbersome for the average user to safely maintain and backup a PKI private key. A number of conventional attempts to address this problem include the use of small hardware devices, referred to as "tokens" or "dongles", to contain the private key in a non-retrievable manner. However, using and distributing small hardware devices to enable the authenticated use of free or low-cost application software ("apps") constitutes a significant barrier to market entry.

Various forms of identification or authentication schemes are described in the following U.S. Pat. Nos. and U.S. Patent Application Publications, each of which is incorporated by reference herein as if set forth in its entirety:

9,374,368
9,369,461
9,294,281
9,288,047
9,258,296
20060184788
20020071564

Also incorporated by reference herein are the following:

ITU-T standard X.509;
SHA-2 and SHA-3 (Secure Hash Algorithms 2 and 3);
Advanced Encryption Standard (AES) promulgated by the National Institute of Standards and Technology (NIST); and
RFC 2898—PKCS #5: Password-Based Cryptography Specification V. 2.0, RSA Laboratories, September 2000.

Although the above-listed documents provide examples of identification or authentication schemes, there exists a need for efficient, inexpensive and low processing-cost methods, systems and computer program code products (software) that enable reliable and attack-resistant authentication of users and other entities seeking access to resources or apps on a network.

The present invention provides methods, systems, devices and computer software/program code products that address this need, and others. Embodiments and practices of the invention are collectively referred to herein as multi-factor-protected private key distribution (MFPPKD).

Aspects, examples, embodiments and practices of the invention, whether in the form of methods, devices, systems or computer software/program code products, are described in greater detail below in conjunction with the attached drawing figures.

SUMMARY OF THE INVENTION

The present invention provides methods, systems and computer program products (software) for enabling reliable, attack-resistant authentication of network-connected users and other entities seeking access to resources, services or application programs ("apps") of a network-connected service provider. The invention also enables authentication of a given user versus another user of a service provider's online services or resources.

In an exemplary practice of the invention, the user's computer, or other digital communications or processing device, computes first and second cryptographically secure hashes and a location reference from multiple sources of secrets, which may include a user name, a password, and/or a device identifier ("Device ID"). In accordance with this exemplary practice of the invention, one of the cryptographic hashes, and the location reference, are sent to an authentication server accessible by or provided by the service provider. The authentication server retrieves a reference entry to find an encrypted data item containing the user's private key, to be used for PKI-based authentication purposes, as well as a cryptographic salt parameter. The user's computer or device can then decrypt the PKI private key using the other cryptographic hash and the cryptographic salt parameter. The double indirection of this method, and the use of a cryptographic salt parameter, ensure that neither of the parties (i.e., the user or the service provider) can obtain the PKI private key without mutual interaction, and only the user in possession of the secrets can decrypt the PICT private key.

In an exemplary practice of the invention, secret key data can be stored at the provider. The provider cannot use stored data, but can only handle the stored data; and the password is merely a component along the path to the key to decipher data, but the provider cannot derive the key.

Methods, systems, devices, and computer software/program code products in accordance with the invention are suitable for implementation or execution in, or in conjunction with, commercially available computer processor devices, digital telecommunications devices, digital processing and communications networks, architectures and configurations.

An exemplary aspect of the invention relates to methods, systems and computer software/program code products operable to enable controlled access to a PKI private key usable by a user's digital computing device operable to communicate with a digital communications network, to enable the user of the digital computing device to obtain secure access to a service, resource or app of a provider entity (e.g., a service provider, content provider or the like) operable to communicate with the network, wherein the method of enabling access comprises: (1) at the user's digital computing device or a digital processor resource associated with the user's digital computing device, utilizing a plurality of secret inputs to compute first and second cryptographically secure hashes and a location reference; (2) transmitting a first of the secure hashes and the location reference from the user's device to an authentication server; (3) at the authentication server, utilizing the first secure hash and the location reference to look up an encrypted data item; (4) transmitting the encrypted data item and an encrypted cryptographic salt parameter to the user's device; and (5) at the user's device or a digital processor resource associated with the user's device, decrypting the encrypted data item using the second secure hash, at least one of the plurality of secret inputs and the cryptographic salt parameter, so as to enable access to the PKI private key.

Another exemplary aspect of the invention is a system for enabling controlled access to a PKI private key usable by a user's digital computing device operable to communicate with a digital communications network, to enable the user to obtain secure access to a service or resource of a service provider operable to communicate with the network, wherein the system comprises: (a) a user's digital computing device operable to communicate with the network, and (b) an authentication server operable to communicate with the network, and wherein the system is operable to: (1) at the user's digital computing device or a digital processing resource associated with the user's digital computing device, utilize a plurality of secret inputs to compute first and second cryptographically secure hashes and a location reference, (2) transmit, via the network, a first of the secure hashes and the location reference from the user's device to the authentication server; (3) at the authentication server, utilize the first secure hash and the location reference to look up an encrypted data item; (4) transmit, via the network, the encrypted data item and an encrypted cryptographic salt parameter to the user's device; and (5) at the user's device or a digital processing resource associated with the user's device, decrypt the encrypted data item using the second secure hash, at least one of the plurality of secret inputs and the cryptographic salt parameter, so as to enable access to the PKI private key.

Another exemplary aspect of the invention is a digital processor program product for use with a digital processing system, for enabling controlled access to a PKI private key usable by a user's digital computing device operable to communicate with a digital communications network, to enable the user to obtain secure access to a service or resource of a service provider operable to communicate with the network, the digital processing system comprising a digital processing resource comprising at least one digital processor in the user's digital computing device and at least one digital processor in an authentication server operable to communicate with the digital communications network, the program product comprising digital processor-executable program instructions stored on a non-transitory digital processor-readable medium, which when executed in the digital processing resource cause the digital processing resource to: (1) at the user's digital computing device, utilize a plurality of secret inputs to compute first and second cryptographically secure hashes and a location reference; (2) transmit, via the network, a first of the secure hashes and the location reference from the user's device to the authentication server; (3) at the authentication server, utilize the first secure hash and the location reference to look up an encrypted data item; (4) transmit, via the network, the encrypted data item and an encrypted cryptographic salt parameter to the user's device; and (5) at the user's device, decrypt the encrypted data item using the second secure hash, at least one of the plurality of secret inputs and the cryptographic salt parameter, so as to enable access to the PKI private key.

In an exemplary practice of the invention, the first and second secure hashes are computed such that knowledge of one hash does not expose the secret inputs or the other hash.

In another exemplary practice of the invention, the first secure hash is required to compute the location reference to the storage location of the encrypted data item.

In another exemplary practice of the invention, the encrypted cryptographic salt parameter is decrypted by the user's device at least in part by applying the second cryptographic hash.

In an exemplary practice of the invention, (1) the plurality of secret inputs comprises: a user name, a password, and a Device ID; (2) the user name and password can be selected by the user, and the Device ID is randomly generated at the time of the initial use of the service and stored on the user's device; (3) the location reference is derived by a cryptographically secure function from the user name, the password and the Device ID; and (4) the first and second secure hashes are derived using two different cryptographic hash functions from the user name and the Device ID.

In another exemplary practice of the invention, the decryption key to decrypt the encrypted data item is obtained by using a password-based key derivation function (PBKDF) of the user's password and the decrypted cryptographic salt parameter.

In another exemplary practice of the invention, the cryptographic salt parameter is divided into parts to serve both as the salt and as an iteration count input for a password-based key derivation function (PBKDF).

In an exemplary practice of the invention, the Device ID can have a selected different value to represent a different authorized device utilized by the user.

In another exemplary practice of the invention, a selected Device ID value can be utilized to authorize account recovery in event of loss, theft, damage or destruction of a first device utilized by the user.

In an exemplary practice of the invention, the decrypted data item is a PKI private key, subsequently usable to sign and authenticate messages validating access to the PKI private key and the user's access to and knowledge of the plurality of secret inputs, thereby proving the identity of the user.

In another exemplary practice of the invention, the PKI private key is stored only in volatile memory of the user's device.

In another exemplary practice of the invention, the decryption key to decrypt the encrypted data item is obtained by using a password-based key derivation function (PBKDF2) derived from XOR-ing a secret input and an iteration count derivative input.

In another exemplary practice of the invention, the secret input is obtained from the user's device and the iteration count derivative input is stored in association with a user's reference record stored on the authentication server and obtained from storage as needed to generate a password-based key derivation function.

These and other aspects, examples, embodiments and practices of the invention, whether in the form of methods, devices, systems or computer software/program code products, will be discussed in greater detail below in the following Detailed Description of the Invention and in connection with the attached drawing figures.

Those skilled in the art will appreciate that while this document provides sufficient detail to enable one skilled in the art to practice the present invention, the various examples, embodiments and practices of the present invention that are discussed and described herein, in conjunction with the attached drawing figures, are provided by way of example, and not by way of limitation. Numerous variations, additions, and other modifications or different implementations of the present invention are possible, and are within the spirit and scope of the invention.

BRIEF DESCRIPTION OF THE DRAWINGS

FIGS. 3A, 3B, 3C, 4A, 4B, 4C and 4D are schematic diagrams of data records in an exemplary practice of the invention.

FIGS. 5A and 5B are schematic diagrams of operations and data flow in an exemplary practice of the invention.

DETAILED DESCRIPTION OF THE INVENTION

Figure 1:
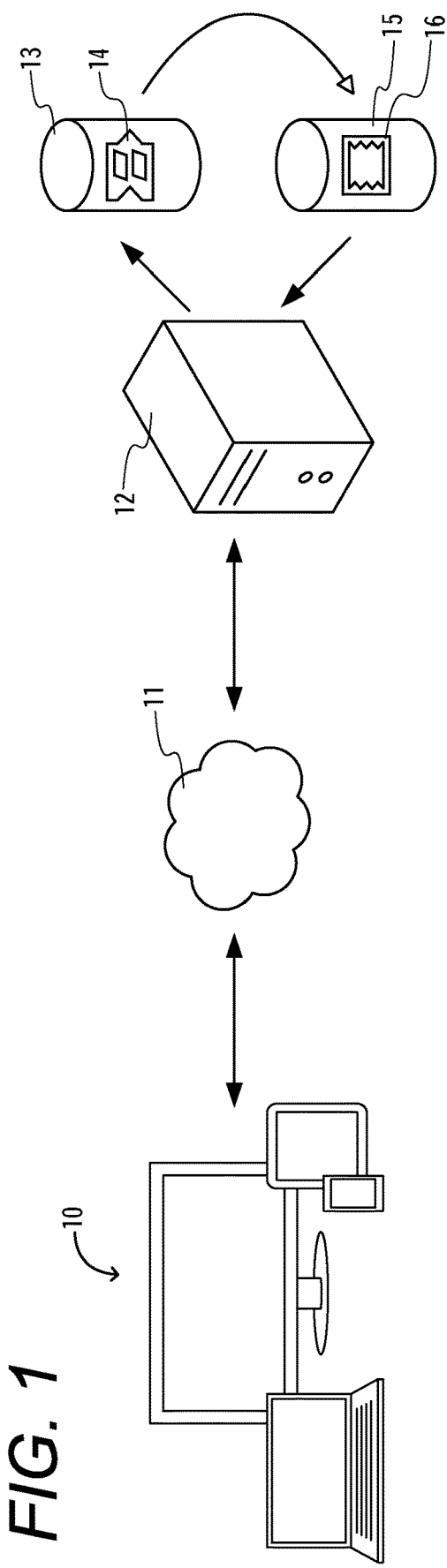
FIG. 1 is a schematic diagram of an exemplary practice of the invention.

Overview of an Exemplary Practice of the Invention:

The present invention provides methods, systems and computer program products (software) for the reliable, attack-resistant authentication of a user to a network-connected service provider, or to another user of the service provider's service. In an exemplary practice of the invention, the user's computer, or other digital communications or processing device, computes first and second cryptographically secure hashes and a location reference from multiple sources of secrets, which may include a user name, a password, and/or a device identifier ("device ID"). In accordance with this exemplary practice of the invention, one of the cryptographic hashes, and the location reference, are sent to an authentication server accessible by or provided by the service provider. The authentication server retrieves a reference entry to find an encrypted data item containing the user's private key, to be used for PKI-based authentication purposes, as well as a cryptographic salt parameter. The user's computer or device can then decrypt the PKI private key using the other cryptographic hash and the cryptographic salt parameter. The double indirection of this method, and the use of a cryptographic salt parameter, ensure that neither of the parties (i.e., the user or the service provider) can obtain the PKI private key without mutual interaction, and only the user in possession of the secrets can decrypt the PKI private key.

Significant Properties of the Invention:

The following are notable properties of an exemplary practice of a PKI authentication scheme in accordance with the invention:

(1) The invention provides authentication and identity establishment utilizing, in part, an industry-standard public key infrastructure (PM), while eliminating obstacles related to the safe storage of cryptographic user data by a user, including a user who may be technologically naive.

(2) The invention enables the authentication of users (i.e. proving their identity) to a service provider whose resources or services the user seeks to access, as well as to other users of the service.

(3) The invention enables an open number of methods for having the user provide secret inputs including, but not limited to, supplying a user name and a password.

(4) The invention provides for multifactor authentication, whereby the possession of only a subset of the set of required secret data is not sufficient to break the authentication scheme.

(5) The invention protects the user from authentication attacks. These may relate, for example, to attempts at identity theft, theft of personal data or other malevolent actions, in the event an attacker gains access to any of: the user secret (such as name/password); data exchanged between the user's device and server (a "man in the middle" attack); a user's computer/mobile device (device theft); data stored on one or more servers of a network or server system (compromised servers and data theft); or wherein the attacker is a malevolent member of staff of the service provider with access to the provider's servers or computer systems.

(6) Many conventional authentication schemes persistently store passwords or secret-derived data, which allows "shortcuts" (for example, a "rainbow attack") to compute user passwords, using only the data persistently stored by the service provider. An attack seeking to overcome the protection afforded by the present invention, in contrast, would need to apply the extremely high computational effort required to exhaust the full range of possible secrets (a "brute-force attack") while at the same time applying a high computational effort for each one of such attempts. The prohibitively high cost and time required for such an attack on a system of the present invention significantly reduces the chance of a large-scale, high-number loss of user identities and passwords in case of a breach of a service provider's infrastructure.

The following are other properties of the invention, some of which are optional (and present in various practices of the invention) and some of which result from implementation of the invention:

(1) In accordance with a practice of the invention, a user name need not be a unique property among the set of all user accounts. The identity of a user can instead be tied to a PKI-based cryptographic certificate (such as an X.509 certificate). This aspect provides the following advantages: Every user can use his or her preferred user name, and the system will not reject a new user with a "user name already taken" rejection. Also, the practice of using an e-mail address as a user name, with the purpose of providing a unique user name, can be eliminated—such a practice is sub-optimal from a privacy standpoint, as it weakens the privacy of a user by allowing the service provider to link the user account to other services.

(2) The authentication data stored on the service provider's servers can be held in two or more separate containers, which allows them to be maintained at two or more different geographic locations, thus increasing breach resiliency.

(3) The double indirection of referencing the user's secret key disables the service provider's ability to map the user's devices to a specific user, thus increasing privacy and enabling multiple devices to be authenticated for a single user account.

Exemplary Implementation of the Invention:

An exemplary practice of the present invention gives a user access to a PKI private key that is not permanently stored on any of the user's devices, but is instead stored in an encrypted form at an authentication provider's data store. The invention ensures that only the authenticated user can access the PKI private key, and neither the authentication provider nor an observer of the data flow between the user and the authentication provider can obtain the private key without substantial and prohibitive effort.

I. Overview of Information Flow:

Referring now to FIG. 1 to describe the general flow of information in accordance with a practice of the invention: Any one of the computing devices (reference numeral 10 in FIG. 1) of a user can be used to communicate with authentication server 12, via a communications or data network 11, such as the Internet. Authentication server 12 can be constructed using known and commercially available digital processing hardware components and associated software elements executing thereon, configured in a manner adapted to implement the present invention.

In accordance with an exemplary practice of the invention, the authentication server 12 maintains two separate data stores: reference data store 13 and key data store 15. These data stores can be implemented in authentication server 12, utilizing commercially available software modules. In accordance with the invention, reference data store 13 contains a plurality of reference records 14 that reference key records 16 from the key data store 15. In accordance with an exemplary practice of the invention, both the reference records 14 and the key records 16 are identified by large, randomly generated indices, that make successful guessing of such indices extremely unlikely. In accordance with the invention, only upon provision of the correct input from the user's device 10 can the authentication server 12 store and retrieve the user's key data. Details of these processes will next be discussed in the contexts of key retrieval and key storage.

II. Key Retrieval:

FIGS. 2-5 are a series of diagrams illustrating systems and techniques in accordance with an exemplary practice of the invention, in which a user 20 makes use of a computing device 10 to retrieve a previously created PKI private key 162 stored at an authentication server 23.

Figure 2:
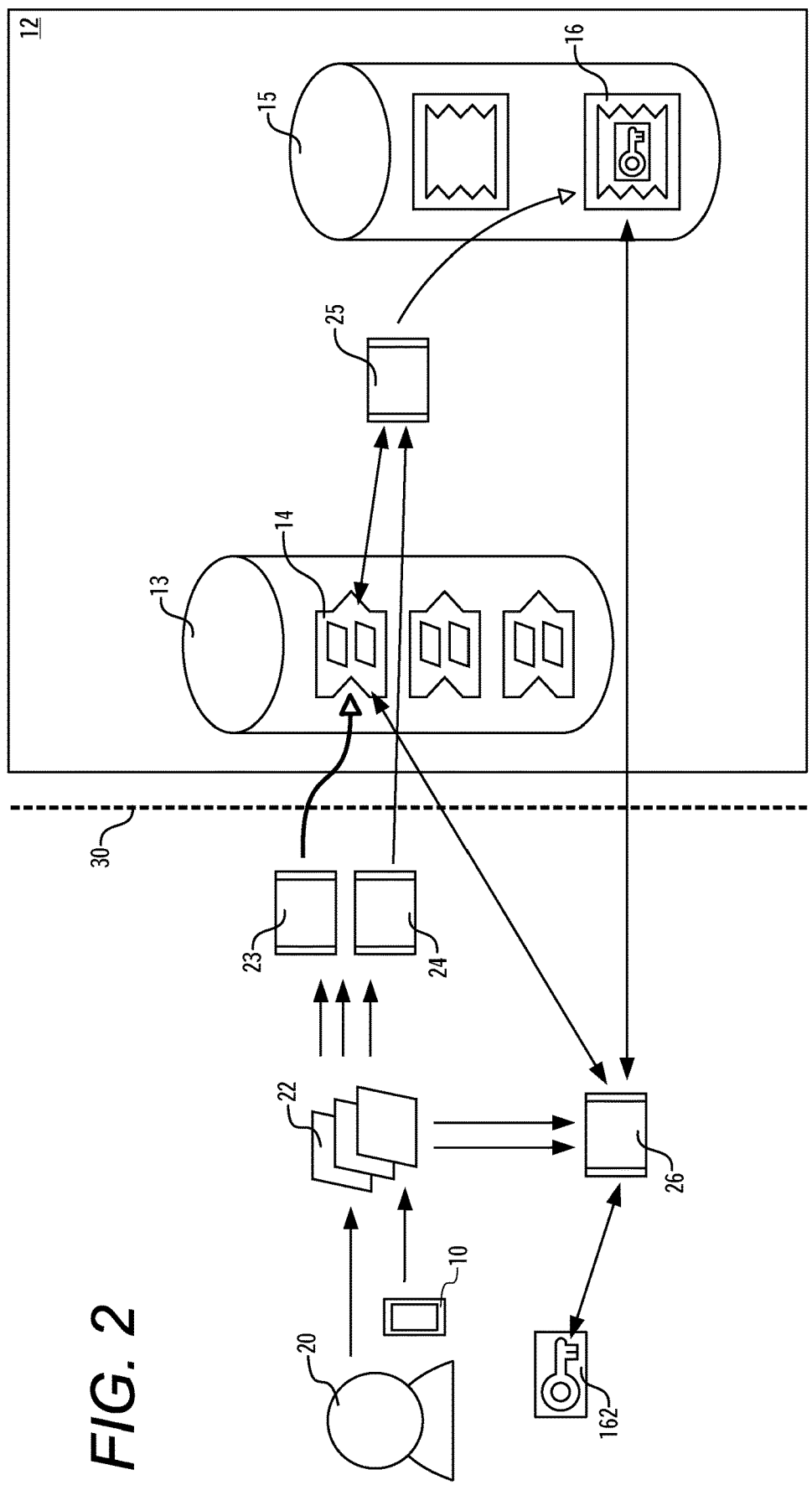
FIG. 2 is a schematic diagram of data and information flow during storage or retrieval of a user's PKI private key in accordance with an exemplary practice of the invention.

In network diagram FIG. 2, an exemplary user 20 is depicted at the left, operating a personal computing device 10, which in the present example is assumed to be a smartphone, tablet, or the like. An exemplary server is represented by box 12 at the right side. A vertical broken line 30 at the middle denotes a functional, and typically spatial, boundary or separation between the user 20 and client device 10 on the one hand, and the authentication provider's server 12 on the other.

As described above, server 12 accesses data from two separate data stores: a reference data store 13 and a key data store 15, each containing a plurality of records 14, 16. Each record contains one or more pieces of previously stored data relating to a respective user. As described in further detail below, the user data, as well as the indexing information required to locate the user data, are each subject to a number of layers of robust encryption techniques.

For the purposes of the present description, it is assumed that the user 20 has previously stored a private key in encrypted form in the key data store 15 at the authentication server 12, using the techniques described below. In particular, it is assumed that as part of the process of submitting the private key to the authentication server 12 for storage, the user has provided a username and password, both of which are currently known to the user. It is further assumed that the computing device that was used to submit the private key for storage is the identical computing device that is currently being used. In addition, it is assumed that the user's computing device and the authentication server 12 have performed the computations described below to encrypt and store the private key and associated reference data.

FIGS. 3A-3C and 4A-4D are a series of diagrams illustrating an exemplary reference record 14 and an exemplary key record 16 stored respectively on the reference data store 13 and the key data store 15. Each of the two data stores 13 and 15 store a plurality of records 14a-14n and 16a-16n. An individual record in a data store is located by means of an "index," which is a string that "points" to a given record. In the present example, a user's reference record is pointed to by Reference-Index 143, and a user's private key record is pointed to by Key-Index 163. As described below, these indices are created during the process of storing the user's private key on the server 12.

Reference record 14 holds at least two pieces of data:

Encrypted-Key-Index 141, which is an encryption of Key-Index 163; and

Encrypted-SALTPARAM-K 142 which is an encryption of a salt parameter that is used in conjunction with a specific set of user inputs and computations described below to decrypt the user's encrypted private key data after it has been located and retrieved from the server 12.

As discussed below, in another exemplary practice of the invention, the user's reference record 14 includes an additional parameter, ITERATION_DERIVATIVE, which can be used in encrypting and decrypting the user's private key 162.

Key record 16 includes at least one piece of data:

Encrypted-Private-Key 161, which is an encryption of the user's stored private key 162.

As shown in FIG. 2, the key retrieval process begins with the user 20 inputting into a computing device 101, such as a smartphone or the like, a set of secret input data 22. As mentioned above, the secret input data 22 and the user's computing device 101 must be identical to the ones used during the signup process.

In the present example of the invention, the secret input data include, but are not limited to:

User-Name 22A—the name provided by the user 20 at signup;

Password 22B—the password provided by the user 20 at signup; and

Device-ID 22C—a "device identifier," which is typically a random number that is generated, for example, at the time of the first use of the device and stored on the device in persistent memory.

These secret inputs 22 are now used in the execution of a series of computations using known forms of digital processing or computational resources located on, or associated with, the authentication server 12 and the user's computing device 10.

Figure 5B:
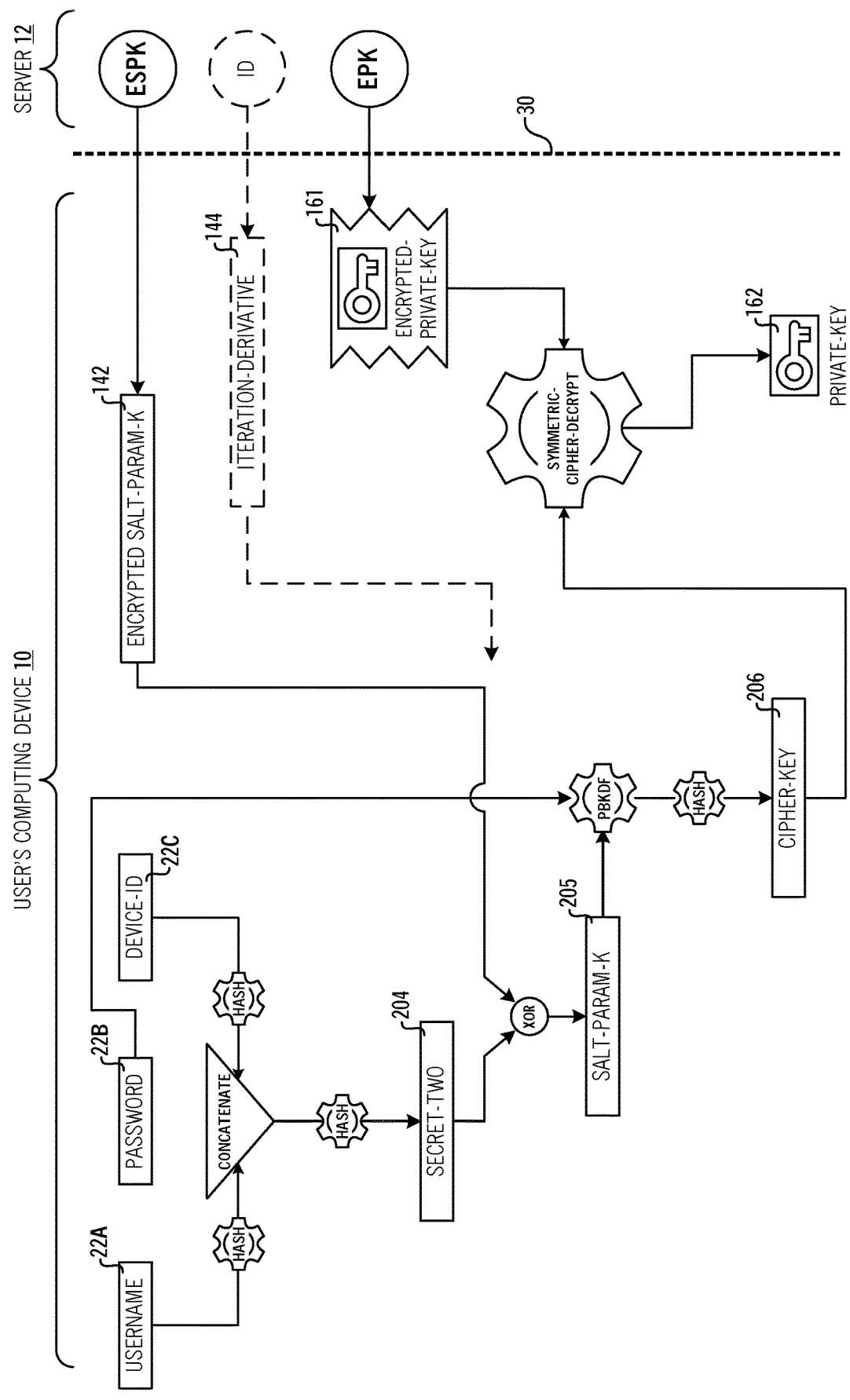

As shown in FIG. 2, a series of computations 23-26 are performed by the user's computing device 10 and the authentication server 12, based upon the user's secret inputs 22, in order to locate, retrieve, and decrypt the user's private key 162. The data flow associated with these computations is illustrated in FIGS. 5A and 5B.

In computation 23, the user's computing device 10 computes Reference-Index 143, which points to the location of the user's reference record 14 in the server's reference record store 13.

Computation 23 includes the following processes 23.1-23.3:

(23.1) SALTPARAM-L:=HASH(Password)
(23.2) L:=PBKDF(Username, SALTPARAM-L)
(23.3) Reference-Index:=HASH(HASH(Device-ID)⊕HASH(L))

In process 23.1, illustrated in FIG. 5A, SALTPARAM-L 201 is computed using a unary HASH function, taking Password 22B as its argument. HASH is a selected, suitable cryptographic hash (such as, by way of example, one of the known SHA2, SHA3 hashes). In accordance with a further aspect of the invention, SALTPARAM-L 101 can be split into suitable parts to serve both as the salt and as the iteration count parameter of the PBKDF-function.

In process 23.2, value L 202 is computed using a binary PBKDF function, taking Username 22A and SALTPARAM-L 101 as its arguments. PBKDF is a Password-Based Key Derivation Function (such as, for example, the PBKDF described in PKCS #5, RFC 2898, cited in the Background of the Invention section above and incorporated herein by reference).

In process 23.3, ⊕ is the bitwise "exclusive OR" ("XOR") operator. Reference-Index 143 is computed by applying the bitwise XOR operator to the respective HASH values of Device-ID 22C and L 202, and then applying the HASH function to the result.

By computing Reference-Index 143, the user's computing device 10 is now able to indicate to the server 12 the location of the user's reference record 14 in the reference data store 13. Based upon this information, the server 12 is able to access the user's Encrypted-Key-Index 141 and the user's Encrypted-Salt-Param-K 142.

Note that in accordance with an exemplary aspect of the invention, the derivation of Reference-Index 23 depends on user-supplied secret input data beyond Username 22A and Password 22B. In such a practice of the invention, the secret inputs 22 include Device-ID 22C. That means that an unauthorized entity attempting to gain access to a user's private key data would require the user name, the password, and the computing device used at signup (or some other way to gain access to the user's Device-ID).

In computation 24, computing device 10 computes the value of Secret-One 203 using the following process 24.1:

(24.1) Secret-One:=HASH(HASH(Device-ID)∥HASH(Username))

where ∥ is the concatenation operator. Thus, Secret-One is a string consisting of all of the characters of HASH(Device-ID) followed by all of the characters of HASH(Username). It is noted that Secret-Two, described below, is created in much the same way, with the exception that in Secret-Two, the order of the two concatenated hash values is reversed.

In accordance with an exemplary practice of the invention, Reference-Index 143 and Secret-One 203 are now sent from the user's device 10 over the data or communications network 11 to the authentication server 12.

In computation 25, the authentication server 12 uses Secret-One 261 and Encrypted-Key-Index to compute Key-Index 163 using the following process 25.1:

(25.1) Key-Index:=Encrypted-Key-Index⊕Secret-One

In computation 25, Encrypted-Key_Index 141 is decrypted by performing a bitwise XOR operation using Encrypted-Key-Index 141 and Secret-One 203 as arguments. According to an aspect of the invention, Secret-One 203 is only temporarily held in memory of the authentication server 12 to perform computation 25. It is then expunged or deleted.

The authentication server 12 uses Key-Index 163 to gain access to the user's related key record 16 in the key data store 15.

The authentication server 12 now sends back to the user's computing device 10 over the data network 11 the following: Encrypted-SALTPARAM-K 142, which has been retrieved from the user's reference record 14; and Encrypted-Private-Key 161, which has been retrieved from the user's key data record 16.

Note that in an exemplary practice of the invention, only Encrypted-SALTPARAM-K 142 and Encrypted-Private-Key 161 are sent out over the network 11. Key-Index and Encrypted-Key-Index 141 never leave the authentication server 12.

As shown in FIG. 2 and illustrated in FIG. 5B, decryption is performed in computation 26, which comprises the following processes:

(26.1) Secret-Two:=HASH(HASH(Username)∥HASH(Device-id))
(26.2) SALTPARAM-K:=Encrypted-SALTPARAM-K⊕Secret-Two
(26.3) Cipher-Key:=HASH(PBKDF(Password, SALTPARAM-K))
(26.4) Private-Key:=SYMMETRIC-CIPHER-DECRYPT (Encrypted-Private-Key, Cipher-Key)

In process 26.1, Secret-Two 204 is computed. As mentioned above, the process is the same as the process used to compute Secret-One 203, except that the two concatenated hash values are concatenated in the reverse order.

In process 26.2, Encrypted-SALTPARAM-K 142 is decrypted by applying the bitwise XOR function to Encrypted-SALTPARAM-K and Secret-Two 204 to arrive at SALTPARAM-K 205.

In process 26.3, Cipher-Key 206 is computed by applying the PBKDF function to Password 22B and SALTPARAM-K 142 and applying the HASH function to the result.

In process 26.4, Encrypted-Private-Key 161 is decrypted by applying the SYMMETRIC-CIPHER-DECRYPT function to Encrypted-Private-Key 161 and Cipher-Key 206, finally arriving at Private-Key 162, the user's PKI private key, to be used for authentication and encryption purposes.

In process 26.4, SYMMETRIC-CIPHER-DECRYPT is a suitable symmetric data encryption/decryption function (such as, by way of example, AES or DES cited in the Background of the Invention section above and incorporated herein by reference).

In an exemplary practice of the invention, Secret-Two 204 never leaves the client device. Note also, that while Secret-One 203 and Secret-Two 204 are both derived from Username 22A and Device-ID 22C, the multiple use of cryptographic HASH functions makes it prohibitively difficult, as a practical matter, to compute one from the other.

As mentioned above and illustrated in FIGS. 5A and 5B, according to a further aspect of the invention, the user's reference record 14 further includes a stored parameter, ITERATION-DERIVATIVE 144. In such a practice of the invention, this parameter is XOR-ed with Secret-Two 204 to compute a parameter PBKDF2 that is used to provide an additional encryption layer before arriving at CIPHER-KEY 206. For example, PBKDF2 can be used in the following processes 27.1-27.3 that are performed after processes 26.1 and 26.2 (and that replace processes 26.3 and 26.4):

(26.1) Secret-Two:=HASH(HASH(Username)‖HASH(Device-ID))
(26.2) SALTPARAM-K:=Encrypted-SALTPARAM-K⊕Secret-Two
(27.1) PBKDF2:=ITERATION-DERIVATIVE⊕Secret-Two
(27.2) Cipher-Key:=HASH (PBKDF [HASH(PBKDF(Password, SALTPARAM-K))], PBKDF2))
(27.3) Private-Key:=SYMMETRIC-CIPHER-DECRYPT (Encrypted-Private-Key, Cipher-Key)

III. Key Storage:

The process for storing private key data on server 12 in accordance with an exemplary practice of the invention employs many of the above-described techniques, and can be understand with reference to FIGS. 2, 3A-3C, 4A-4D and 5A-5B.

From the above description, it can be seen that the computations are based upon the following core data:

(1) the user's Private Key 162;
(2) the user's secret inputs 22 (i.e., Username 22A, Password 22B, and Device-ID 22C);
(3) Key-Index 163; and
(4) SALTPARAM-K.

Regarding (1), it is assumed that the user is already in possession of a private key to be stored. Alternatively, a private key may be generated by the authentication server 12 or a third party.

Regarding (2), Username 22A and Password 22B can be selected by the user 20, or alternatively can be generated in any number of different ways known in the art. As discussed above, Device-ID 22C is typically automatically generated when a computing device is first used. If necessary, and new Device-ID can be generated for use in the storage and subsequent retrieval of the user's private key.

Regarding (3) and (4), according to an exemplary practice of the invention, Key-Index 163 is randomly generated by the authentication server 12, and SALTPARAM-K is randomly generated by the user's computing device.

As discussed above, the user's secret inputs 22 are used to compute Reference-Index 143, as follows:

(3.01) SALTPARAM-L:=HASH(Password)
(3.02) L:=PBKDF(Username, SALTPARAM-L)
(3.03) Reference-Index:=HASH(HASH(Device-id)⊕HASH(L))

Note that it is extremely unlikely that there exists an identical reference record for a different set of secret user inputs, due to the large range of the possible Reference-Index values (e.g., $2^{128}$). In the extremely unlikely instance of a Reference-Index collision, a new Device-ID can be generated and the process repeated.

Secret-One 203 and Secret Two are computed as follows:

(3.03) Secret-One:=HASH(HASH(Device-id)‖HASH(Username)).
(3.04) Secret-One:=HASH(HASH(Username)‖HASH(Device-ID)).

Reference-Index 143 is used by the server 12 to identify a location in the reference data store for user's reference record 14.

Secret-One 20 is used to encrypt the randomly generated Key-Index 163, as follows:

(3.05) Encrypted-Key-Index:=Key-Index⊕Secret-One

It is noted that the bitwise XOR function is symmetric. Thus, Key-Index 163 can be both encrypted and decrypted by XOR-ing it with Secret-One 20. Encrypted-Key-Index 141 is then stored in the user's reference record 14.

As shown in FIG. 5B, randomly generated SALT-PARAM-K 142 is used in conjunction with Password 22B to create Cipher-Key 206, which in turn is used to encrypt Private-Key. SYMMETRIC-CIPHER-DECRYPT is used for both encryption and decryption. Thus, using that function with Cipher-Key and Private-Key as arguments produces Encrypted-Private-Key 161, as follows:

(3.06) Secret-Two:=HASH(HASH(Username)‖HASH(Device-id))
(3.07) Cipher-Key:=HASH(PBKDF(Password, Encrypted-SALTPARAM-K))
(3.08) Encrypted Private-Key:=SYMMETRIC-CIPHER-ENCRYPT(Private-Key, Cipher-Key)

Encrypted Private-Key 161 is then sent to the server 12 to be stored in the key data store 15 at the location pointed to by the randomly generated Key-Index 163.

SALT-PARAM-K 142 is encrypted by XOR-ing it with Secret-Two 204, as follows:

(3.09) Encrypted-SALTPARAM-K:=SALTPARAM-K⊕Secret-Two

ENCRYPTED-SALT-PARAM-K 142 is then sent to the server to be stored in the user's reference record 14 in the reference data store 13.

Note that techniques described herein are configured such that there exists only a single key record 16 for each user, and such that when additional reference records 14 are subsequently created for the same user (for example, using a different device), the same Key-Index 163 is computed while the corresponding Secret-One 203 varies, resulting in a different value for the Encrypted-Key-Index 141 stored in that particular record 14.

Those skilled in the art will understand that the various user devices, authentication server(s) and data stores described in connection with the practices and embodiments of the invention discussed herein can be constructed and operated using commercially available digital processing devices and structures, and commercially available software elements executing thereon, configured in a manner adapted to implement the present invention.

In an exemplary practice of the invention, secret key data can be stored at the provider. The provider cannot use stored data, but can only handle the stored data; and the password is merely a component along the path to the key to decipher data, but the provider cannot derive the key.

Digital Processing Environments in which Invention can be Implemented

The following is a discussion, to be read in connection with FIGS. 6-9, of underlying digital processing structures and environments in which the invention may be implemented and practiced.

It will be understood by those skilled in the art that the present invention provides methods, systems, devices and computer program products that can be implemented as part of the computer software or computer hardware of a computer, "smartphone", tablet computer, or other computing device, which may include a mobile computing device, that forms part of a computer network or telecommunications network, along with a display, user interface elements such as a keyboard, tablet and/or mouse, memory, storage, and other conventional computer system or telecommunications system components. While conventional components of such kinds are well known to those skilled in the art, and thus need not be described in great detail herein, the following overview indicates how the present invention can be implemented in conjunction with such components.

It will also be understood by those skilled in the art that aspects of the invention can be implemented in software, hardware, or a combination of software and hardware, using conventional computer apparatus such as a personal computer (PC), smartphone, tablet computer, or equivalent device operating in accordance with (or emulating) a conventional operating system such as iOS, Microsoft Windows, Linux, Android, or other, either in a standalone configuration or across a network. The various processing aspects and means described herein may therefore be implemented in the software and/or hardware elements of a properly configured digital processing device or network of devices. Processing may be performed sequentially or in parallel, and may be implemented using special purpose or re-configurable hardware.

Figure 6:
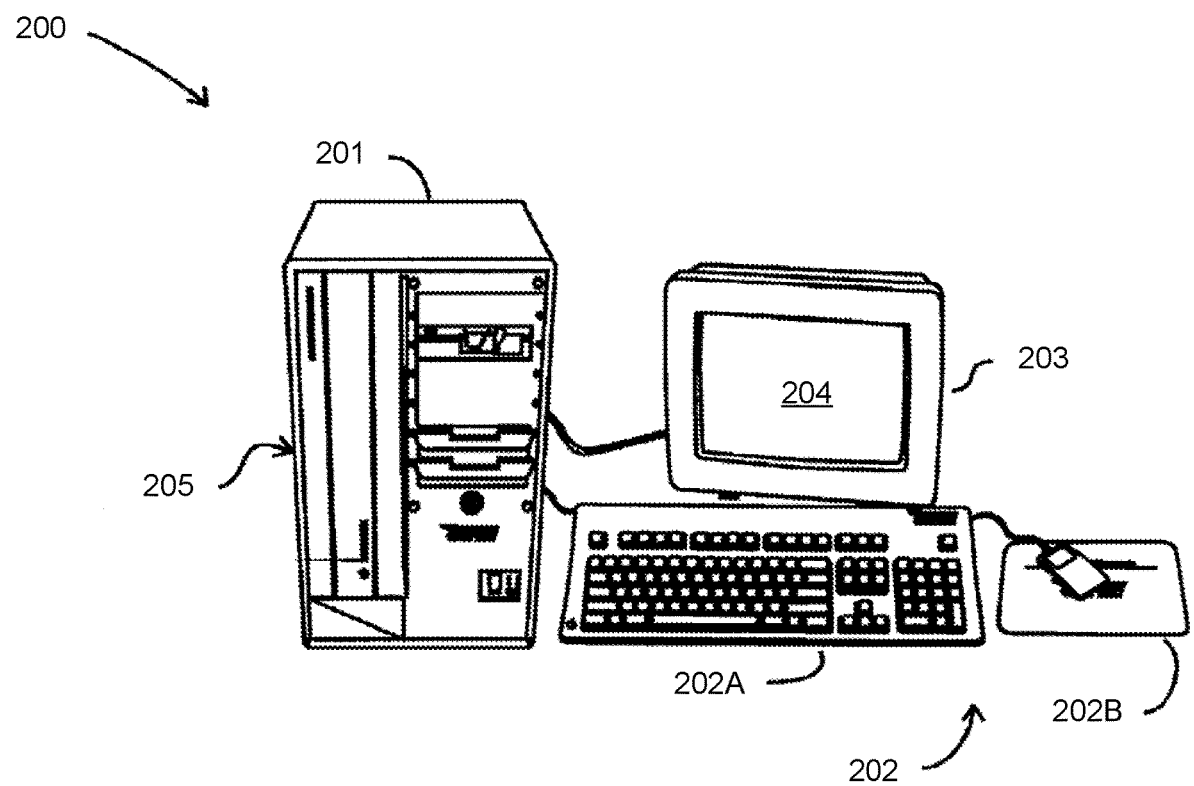
FIGS. 6-9 are schematic diagrams of digital processing environments in which the invention can be implemented.

As an example, FIG. 6 depicts an illustrative computer system 200 that can execute such processes. Although FIG. 6 generally depicts a conventional PC architecture, equivalent structures and functions can be embodied in a tablet computer, smartphone or other mobile computing device. With reference to FIG. 6, the computer system 200 can include a processor module 201 and operator interface elements 202, 203 comprising operator input components such as a keyboard 202A and/or a mouse 202B (or other analogous element(s), generally identified as operator input element(s) 202) and an operator output element such as a display 203. The illustrative computer system 200 can be of a conventional stored-program computer architecture. The processor module 201 can include, for example, one or more processor, memory and mass storage devices, such as disk storage elements (not separately shown), which perform processing and storage operations in connection with digital data provided thereto. The operator input element(s) 202 can be provided to permit an operator to input information for processing. The display 203 can be provided to display output information generated by the processor module 201 on a screen 204 to the operator, including data that the operator may input for processing, information that the operator may input to control processing, as well as information generated during processing. The processor module 201 can generate information for display by the video display device 203 using a graphical user interface (GUI), in which information for various applications programs is displayed using various windows. Alternatively, aspects of the invention can be embodied at least in part in a commercially available tablet computer, smartphone or other mobile computing platform that contains functional elements equivalent to those noted above.

The terms "memory", "storage" and "disk storage devices" can encompass any computer readable medium, such as a computer hard disk, computer floppy disk, computer-readable flash drive, computer-readable RAM or ROM element or any other known means of encoding digital information. The term "applications programs", "applications", "apps", "programs", "computer program product" or "computer software product" can encompass any computer program product consisting of computer-readable programs instructions encoded and/or stored on a computer readable medium, whether that medium is fixed or removable, permanent or erasable, or otherwise As noted, for example, in block 1318 of the schematic block diagram of FIG. 8, applications and data can be stored on a disk, in RAM, ROM, on other removable or fixed storage, whether internal or external, and can be downloaded or uploaded, in accordance with practices and techniques well known in the art. As will also be noted in this document, the present invention can take the form of software or a computer program product stored on a computer-readable medium, or it can be in the form of computer program code that can be uploaded or downloaded, or fixed in a ROM or other electronic structure, or it can take the form of a method or a system for carrying out such a method.

Although in FIG. 6 the computer system 200 is shown as comprising particular components, such as the keyboard 202A and mouse 202B for receiving input information from an operator, and a display 203 for displaying output information to the operator, it will be appreciated that the computer system 200 may include a variety of components in addition to or instead of those depicted in FIG. 6. Alternatively, the invention can be embodied in a commercially available smartphone, tablet computer or other mobile device that contains functional elements equivalent to those noted above.

In addition, the processor module 201 of FIG. 6 can include one or more network ports, generally identified by reference numeral 205, which are connected to communication links which connect the computer system 200 in a computer network. The network ports enable the computer system 200 to transmit information to, and receive information from, other computer systems and other devices in the network. In a typical network organized according to, for example, a client-server paradigm, certain computer systems in the network may be designated as servers, which store data and programs (generally, "information") for processing by the other, client computer systems. (See, for example, FIGS. 7 and 9.) A client computer system that needs access to information maintained by a particular server will enable or cause the server to download the information to it over the network. After processing the data, the client computer system may also return processed data to the server for storage. In addition to computer systems (including the above-described servers and clients), a network may also include, for example, other resources which may be shared among the various computer systems connected in the network. The communication links interconnecting the computer systems in the network may comprise any convenient information-carrying medium, including wires, optical fibers or other media for carrying signals among the computer systems. Computer systems transfer information over the network by means of messages transferred over the communication links, with each message including information and an identifier identifying the device to receive the message.

Figure 7:
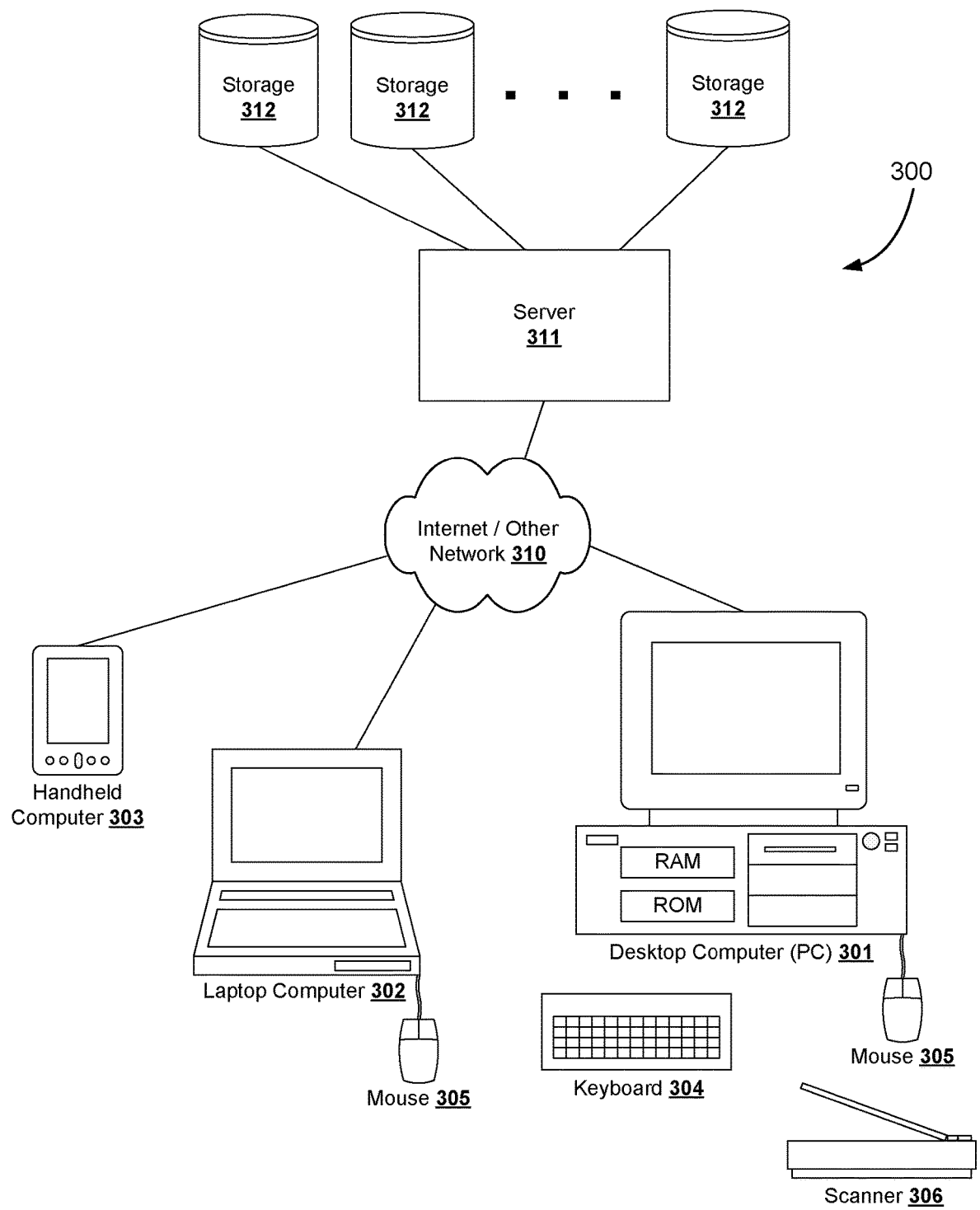
Figure 8:
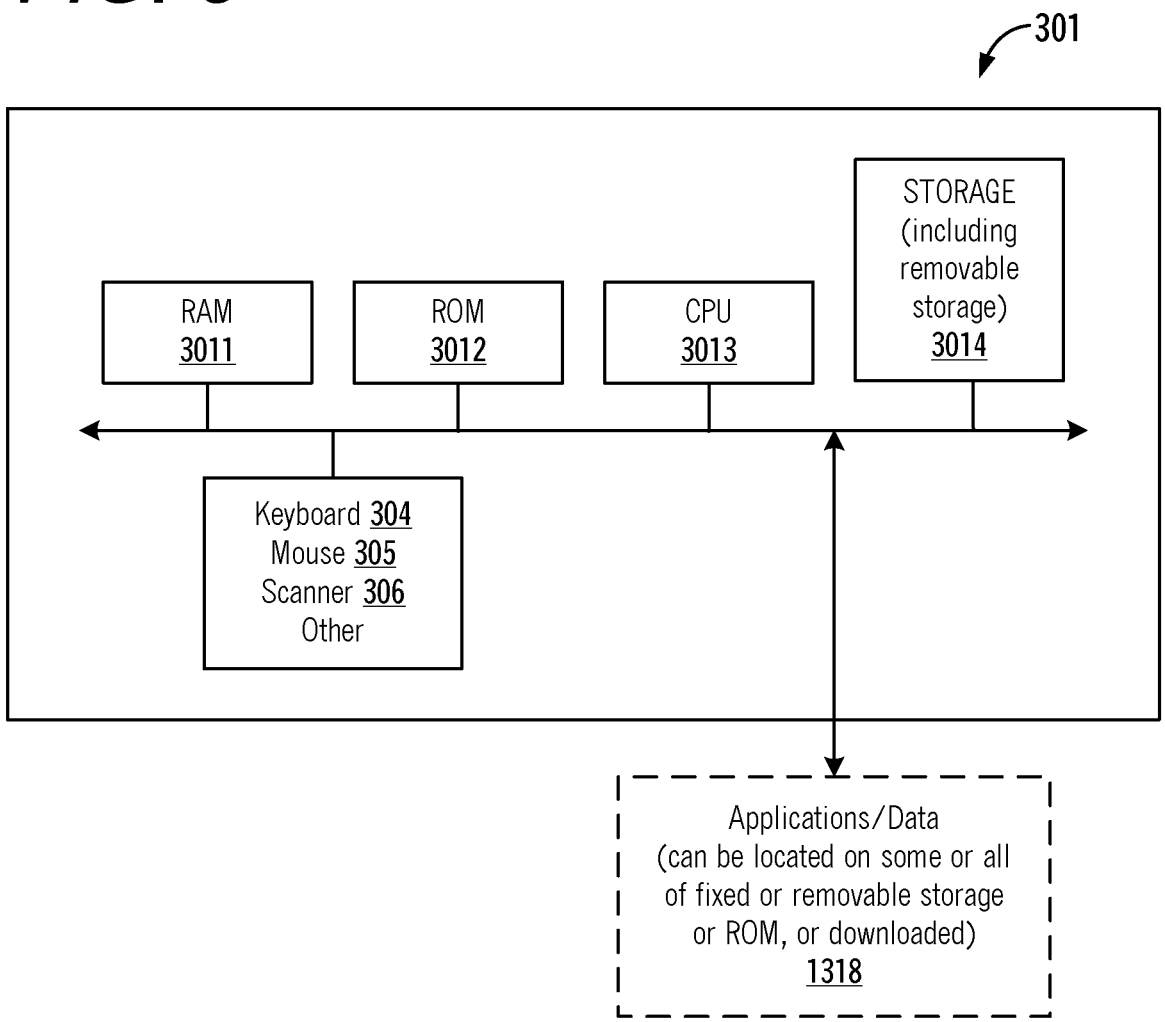
Figure 9:
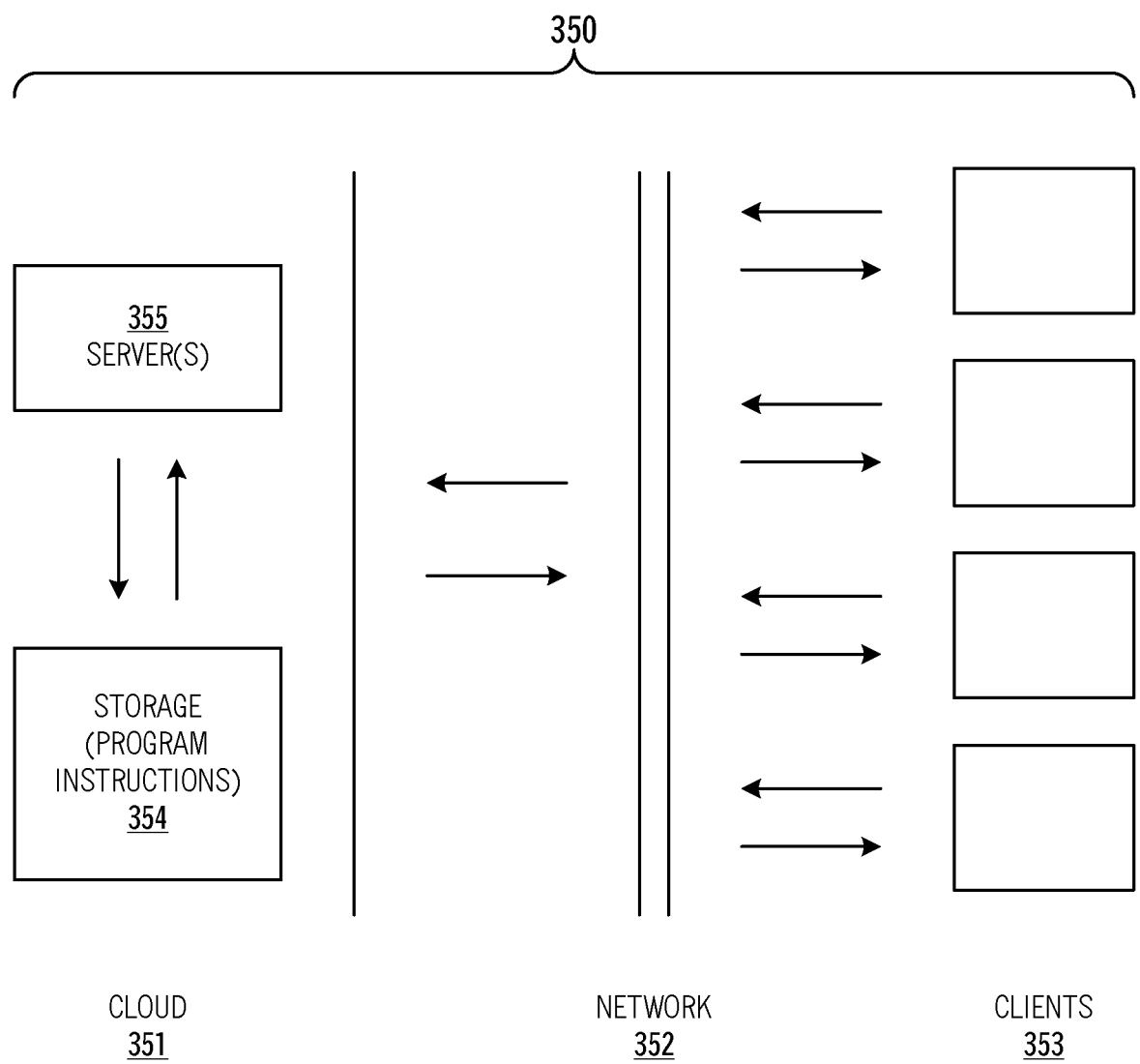

In addition to the computer system 200 shown in FIG. 6, methods, devices or software products in accordance with the present invention can operate on any of a wide range of conventional computing devices and systems, such as those depicted by way of example in FIGS. 7, 8 and 9 (e.g., network system 300 of FIG. 7), whether standalone, networked, portable or fixed, including conventional PCs 301 of FIGS. 7 and 8 (which may include, for example, a keyboard 304, mouse 305, and scanner 306), laptops 302 (which may include, for example, a mouse 305), handheld or mobile computers 303, or across the Internet or other networks 310, which may in turn include servers 311 and storage 312. Alternatively, aspects of the invention can be embodied at least in part in a commercially available smartphone, tablet computer or other mobile device that contains functional elements equivalent to those noted above.

In accord with conventional computer software and hardware practice, a software application configured in accordance with the invention can operate within, e.g., a PC, such as PC 301 shown in FIGS. 7 and 8, or known forms of handheld computing device, smartphone or tablet computer 303, in which program instructions can be read from ROM or CD ROM 3012 (FIG. 8), magnetic disk or other storage 3014 and loaded into RANI 3011 for execution by CPU 3013. Data can be input into the system via any known device or means, including a conventional keyboard 304, mouse 305, scanner 306, digitizing tablet, or other elements as shown in FIGS. 7 and 8. As also shown in FIG. 8, the depicted storage 3014 includes removable storage. As further shown in FIG. 8, applications and/or data 1318 can be located on some or all of fixed or removable storage or ROM, or downloaded.

FIG. 9 is a diagram of one form (although not the only form) of cloud configuration 350 in which the invention can be implemented, comprising a cloud layer 351, a network layer 352, and a client layer 353. Program instructions or software applications contained in storage 354 within the cloud layer 351 are accessible by servers 355 that communicate via network 352 with individual clients in the client layer 353.

The invention described herein has been implemented by the Applicant, using commercially available server and client hardware elements, operating in conjunction with commercially available operating systems ("OS's").

As implementation platforms, client operating systems can include known forms of iOS, MacOS, Android, Windows, and Linux/Unix operating systems; and the server operating systems include known forms of Linux/Unix and MacOS operating systems. Those skilled in the relevant art will understand and appreciate that the invention can be implemented on a wide range of current computing systems.

Those skilled in the art will understand that aspects of the invention described herein can be executed in hardware elements, such as at the server level, or at a microprocessor level, such as within a Field-Programmable Gate Array (FPGA) or an Application-Specific Integrated Circuit (ASIC) constructed specifically to carry out the processes described herein, using ASIC construction techniques known to ASIC manufacturers. The actual semiconductor elements of a conventional ASIC or equivalent integrated circuit are not part of the present invention, and will not be discussed in detail herein. Alternatively, general-purpose processors can be used to execute aspects of the invention.

Those skilled in the art will understand that the above described embodiments, practices and examples of the invention can be implemented using known forms of communications or digital processing networks, computer processors and telecommunications devices, in which the telecommunications devices can include known forms of cellphones, smartphones, and other known forms of mobile devices, tablet computers, desktop and laptop computers, and known forms of digital network components and server/cloud/network/client architectures that enable communications between such devices.

Those skilled in the art will also understand that method aspects of the present invention can be executed within commercially available digital processing devices and systems, such as servers, PC's, laptop computers, tablet computers, personal computers (PCs) and smartphones or other mobile devices, operating under the collective command of the smartphones or computer's operating system, such as iOS, Android or Windows, and a computer program product configured in accordance with the present invention, as well as known forms of digital networks, including architectures comprising server, cloud, network, and client aspects, for communications between such devices.

The terms "computer software," "computer code product," and "computer program product" as used herein can encompass any set of computer-readable programs instructions encoded on a non-transitory computer readable medium. A computer readable medium can encompass any form of computer readable element, including, but not limited to, a computer hard disk, computer floppy disk, computer-readable flash drive, computer readable RAM or ROM element. or any other known means of encoding, storing or providing digital information, whether local to or remote from the workstation, PC or other digital processing device or system. Various forms of computer readable elements and media are well known in the computing arts, and their selection is left to the implementer.

In addition, those skilled in the art will understand that the invention can be implemented using computer program modules and digital processing hardware elements, including memory units and other data storage units, including commercially available processing units, memory units, computers, servers, smartphones, tablet computers and other computing and telecommunications devices, including mobile devices. The term "modules", "program modules", "components", and the like include computer program instructions, objects, components, data structures, and the like that can be executed to perform selected tasks or achieve selected outcomes. The various modules shown in the drawings and discussed in the description herein refer to computer-based or digital processor-based elements that can be implemented as software, hardware, firmware and/or other suitable components, taken separately or in combination, that provide the functions described herein, and which may be read from computer storage or memory, loaded into the memory of a digital processor or set of digital processors, connected via a bus, a communications network, or other communications pathways, which, taken together, constitute an embodiment of the present invention.

The terms "data storage module", "data storage element", "memory element" and the like, as used herein, can refer to any appropriate memory element usable for storing program instructions, machine readable files, databases, and other data structures. The various digital processing, memory and storage elements described herein can be implemented to operate on a single computing device or system, such as a server or collection of servers, or they can be implemented and inter-operated on various devices across a network, whether in a server-client arrangement, server-cloud-client arrangement, or other configuration in which client devices can communicate with allocated resources, functions or applications programs, or with a server, via a communications network.

It will also be understood that computer program instructions suitable for a practice of the present invention can be written in any of a wide range of computer programming languages, including Java, C++, and the like. It will also be understood that method operations shown in the flowcharts can be executed in different orders, and that not all operations shown need be executed, and that many other combinations of method operations are within the scope of the invention as defined by the attached claims. Moreover, the functions provided by the modules and elements shown in the drawings and described in the foregoing description can be combined or sub-divided in various ways, and still be within the scope of the invention as defined by the attached claims.

Flowcharts of Exemplary Practices of the Invention

FIG. 10 (divided into 10A and 10B, for clarity of presentation on two separate sheets) is a flowchart illustrating exemplary method aspects and practices of the invention. The method aspects depicted in this flowchart are examples only; the organization, order and number of operations in the exemplary practices can be varied; and the exemplary practices and methods can be arranged or ordered differently, and include different functions, whether singly or in combination, while still being within the spirit and scope of the present invention.

Items described below in parentheses are, among other aspects, optional in a given practice of the invention.

Figure 10A:
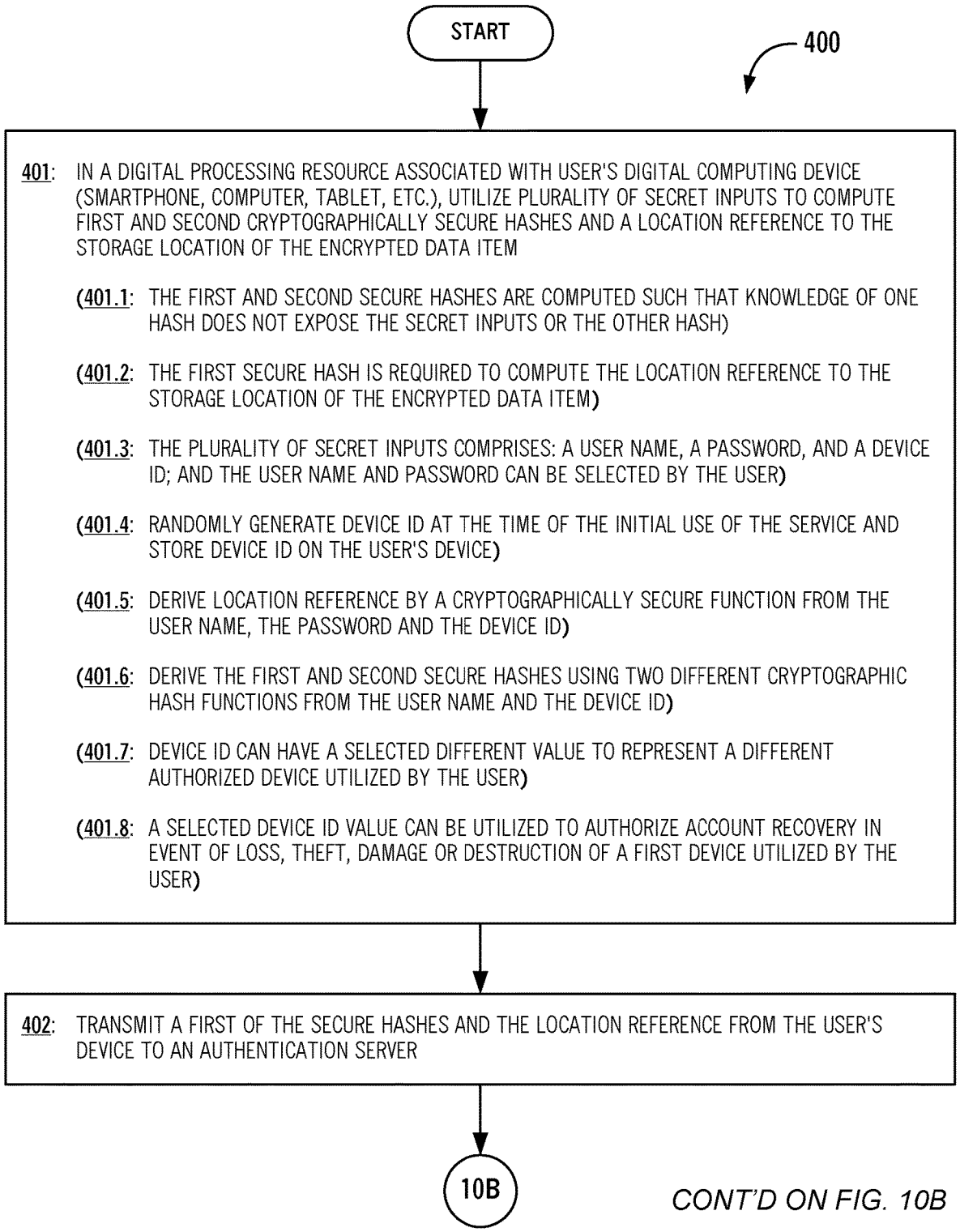
FIGS. 10A and 10B are flowcharts depicting exemplary method aspects of the invention.
Figure 10B:
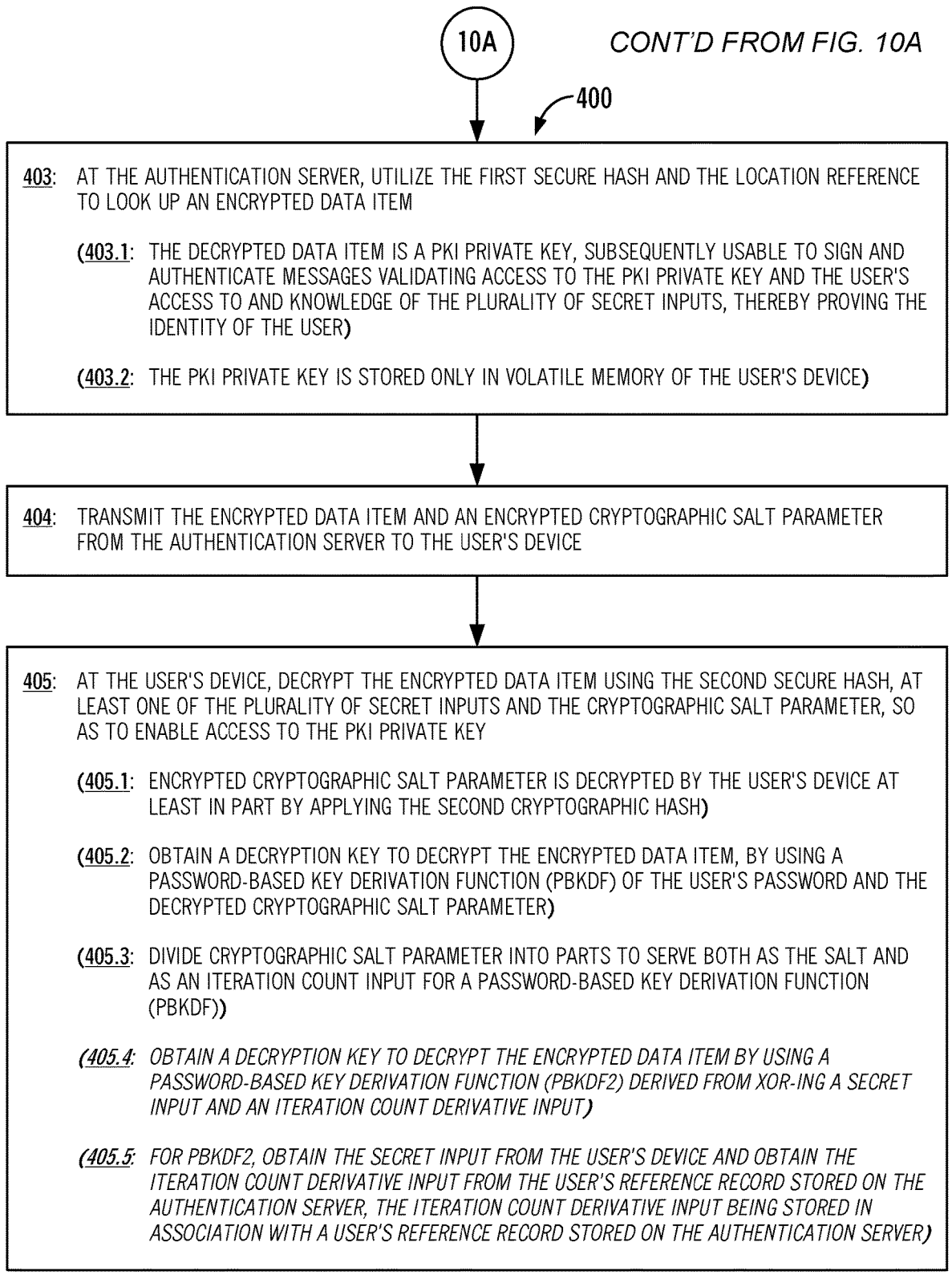

In particular, FIGS. 10A and 10B show a method 400 according to an exemplary practice of the invention, including the following operations:

401: At the user's digital computing device (smartphone, computer, tablet, etc.), utilize a plurality of secret inputs to compute first and second cryptographically secure hashes and a location reference to the storage location of the encrypted data item.

(401.1: The first and second secure hashes are computed such that knowledge of one hash does not expose the secret inputs or the other hash)

(401.2: The first secure hash is required to compute the location reference to the storage location of the encrypted data item).

(401.3: The plurality of secret inputs comprises: a user name, a password, and a Device ID; AND the user name and password can be selected by the user).

(401.4: Randomly generate Device ID at the time of the initial use of the service and store Device ID on the user's device).

(401.5: Derive the location reference by a cryptographically secure function from the user name, the password and the Device ID).

(401.6: Derive the first and second secure hashes using two different cryptographic hash functions from the user name and the Device ID).

(401.7: Device ID can have a selected different value to represent a different authorized device utilized by the user).

(401.8: A selected Device ID value can be utilized to authorize account recovery in event of loss, theft, damage or destruction of a first device utilized by the user).

402: Transmit a first of the secure hashes and the location reference from the user's device to an authentication server.

403: At the authentication server, utilize the first secure hash and the location reference to look up an encrypted data item.

(403.1: The decrypted data item is a PKI private key, subsequently usable to sign and authenticate messages validating access to the PKI private key and the user's access to and knowledge of the plurality of secret inputs, thereby proving the identity of the user).

(403.2: The PKI private key is stored only in volatile memory of the user's device).

404: Transmit the encrypted data item and an encrypted cryptographic salt parameter from the authentication server to the user's device.

405: At the user's device, decrypt the encrypted data item using the second secure hash, at least one of the plurality of secret inputs and the cryptographic salt parameter, so as to enable access to the PKI private key.

(405.1: Encrypted cryptographic salt parameter is decrypted by the user's device at least in part by applying the second cryptographic hash).

(405.2: Obtain a decryption key to decrypt the encrypted data item, by using a password-based key derivation function (PBKDF) of the user's password and the decrypted cryptographic salt parameter).

(405.3: Divide cryptographic salt parameter into parts to serve both as the salt and as an iteration count input for a password-based key derivation function (PBKDF)).

(405.4: Obtain a decryption key to decrypt the encrypted data item by using a password-based key derivation function (PBKDF2) derived from XOR-ing a secret input and an iteration count derivative input).

(405.5: For PBKDF2, obtain the secret input from the user's device and obtain the iteration count derivative input from the user's reference record stored on the authentication server, the iteration count derivative input being stored in association with a user's reference record stored on the authentication server).

CONCLUSION

While the foregoing description and the accompanying drawing figures provide details that will enable those skilled in the art to practice aspects of the invention, it should be recognized that the description is illustrative in nature and that many modifications and variations thereof will be apparent to those skilled in the art having the benefit of these teachings. It is accordingly intended that the invention herein be defined solely by any claims that may be appended hereto and that the invention be interpreted as broadly as permitted by the prior art.

We claim:

1. A method of enabling access to a PKI private key usable by a user's digital computing device operable to communicate with a digital communications network, to enable the user of the digital computing device to obtain secure access to a service or resource of a provider entity operable to communicate with the network, the method of enabling access comprising:

at the user's digital computing device, utilizing a plurality of secret inputs to compute first and second cryptographically secure hashes and a location reference;

transmitting a first of the secure hashes and the location reference from the user's device to an authentication server;

at the authentication server, utilizing the first secure hash and the location reference to look up an encrypted data item;

transmitting the encrypted data item and an encrypted cryptographic salt parameter to the user's device; and at the user's device, decrypting the encrypted data item using the second secure hash, at least one of the plurality of secret inputs and the cryptographic salt parameter, so as to enable access to the PKI private key;

wherein the first secure hash is required to compute the location reference to the storage location of the encrypted data item.

2. The method of claim 1 wherein the first and second secure hashes are computed such that knowledge of one hash does not expose the secret inputs or the other hash.

3. The method of claim 2 wherein the encrypted cryptographic salt parameter is decrypted by the user's device at least in part by applying the second cryptographic hash.

4. The method of claim 3 wherein:

the plurality of secret inputs comprises: a user name, a password, and a Device ID;

the user name and password can be selected by the user, and the Device ID is randomly generated at the time of the initial use of the service or resource and stored on the user's device;

the location reference is derived by a cryptographically secure function from the user name, the password and the Device ID; and the first and second secure hashes are derived using two different cryptographic hash functions from the user name and the Device ID.

5. The method of claim 4 wherein the decryption key to decrypt the encrypted data item is obtained by using a password-based key derivation function (PBKDF) of the user's password and the decrypted cryptographic salt parameter.

6. The method of claim 5 wherein the cryptographic salt parameter is divided into parts to serve both as the salt and as an iteration count input for a password-based key derivation function (PBKDF).

7. The method of claim 4 wherein the Device ID can have a selected different value to represent a different authorized device utilized by the user.

8. The method of claim 7 wherein a selected Device ID value can be utilized to authorize account recovery in event of loss, theft, damage or destruction of a first device utilized by the user.

9. The method of claim 1 wherein the decrypted data item is a PKI private key, subsequently usable to sign and authenticate messages validating access to the PKI private key and the user's access to and knowledge of the plurality of secret inputs, thereby proving the identity of the user.

10. The method of claim 9 wherein the PKI private key is stored only in volatile memory of the user's device.

11. The method of claim 4 wherein the decryption key to decrypt the encrypted data item is obtained by using a password-based key derivation function (PBKDF2) derived from XOR-ing a secret input and an iteration count derivative input.

12. The method of claim 11 wherein the secret input is obtained from the user's device and the iteration count derivative input is stored in association with a user's reference record stored on the authentication server.

13. A system for enabling access to a PKI private key usable by a user's digital computing device operable to communicate with a digital communications network, to enable the user to obtain secure access to a service or resource of a provider entity operable to communicate with the network, the system comprising:

(A) a digital processor resource, the digital processor resource being associated with a user's digital computing device and operable to communicate with the network; and (B) an authentication server operable to communicate with the network;

the system being operable to:

at the digital processor resource associated with the user's digital computing device, utilize a plurality of secret inputs to compute first and second cryptographically secure hashes and a location reference;

transmit, via the network, a first of the secure hashes and the location reference from the user's device to the authentication server;

at the authentication server, utilize the first secure hash and the location reference to look up an encrypted data item;

transmit, via the network, the encrypted data item and an encrypted cryptographic salt parameter to the digital processor resource associated with the user's device; and at the user's device, decrypt the encrypted data item using the second secure hash, at least one of the plurality of secret inputs and the cryptographic salt parameter, so as to enable access to the PKI private key;

wherein the first secure hash is required to compute the location reference to the storage location of the encrypted data item.

14. The system of claim 13 wherein the decryption key to decrypt the encrypted data item is obtained by using a password-based key derivation function (PBKDF2) derived from XOR-ing a secret input and an iteration count derivative input.

15. The system of claim 14 wherein the secret input is obtained from the user's device and the iteration count derivative input is stored in association with a user's reference record stored on the authentication server.

16. A digital processor program product for use with a digital processing system, for enabling access to a PKI private key usable by a user's digital computing device operable to communicate with a digital communications network, to enable the user to obtain secure access to a service or resource of a provider entity operable to communicate with the network, the digital processing system comprising a digital processing resource comprising at least one digital processor in the user's digital computing device and at least one digital processor in an authentication server operable to communicate with the digital communications network, the program product comprising digital processor-executable program instructions stored on a non-transitory digital processor-readable medium, which when executed in the digital processing resource cause the digital processing resource to:

at the user's digital computing device, utilize a plurality of secret inputs to compute first and second cryptographically secure hashes and a location reference;

transmit, via the network, a first of the secure hashes and the location reference from the user's device to the authentication server;

at the authentication server, utilize the first secure hash and the location reference to look up an encrypted data item;

transmit, via the network, the encrypted data item and an encrypted cryptographic salt parameter to the user's device; and at the user's device, decrypt the encrypted data item using the second secure hash, at least one of the plurality of secret inputs and the cryptographic salt parameter, so as to enable access to the PKI private key;

wherein the first secure hash is required to compute the location reference to the storage location of the encrypted data item.

17. The program product of claim 16 wherein the decryption key to decrypt the encrypted data item is obtained by using a password-based key derivation function (PBKDF2) derived from XOR-ing a secret input and an iteration count derivative input.

18. The program product of claim 17 wherein the secret input is obtained from the user's device and the iteration count derivative input is stored in association with a user's reference record stored on the authentication server.

* * * * *